Aug. 22, 1950     K. W. MacKENZIE     2,519,678
FRUIT GATHERER
Filed June 15, 1948     2 Sheets—Sheet 1
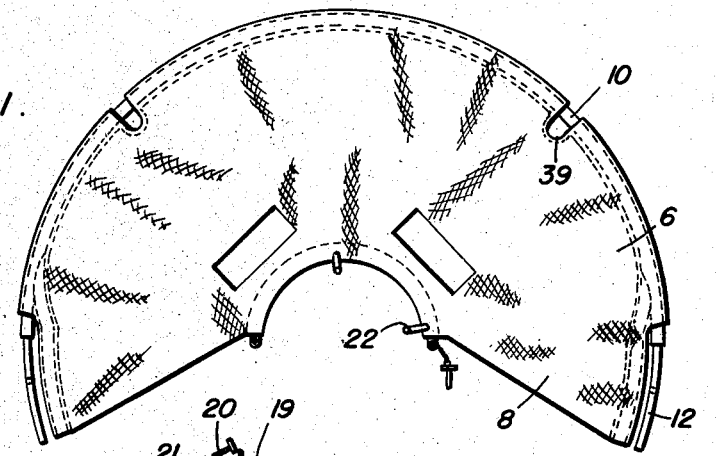
Fig. 1.
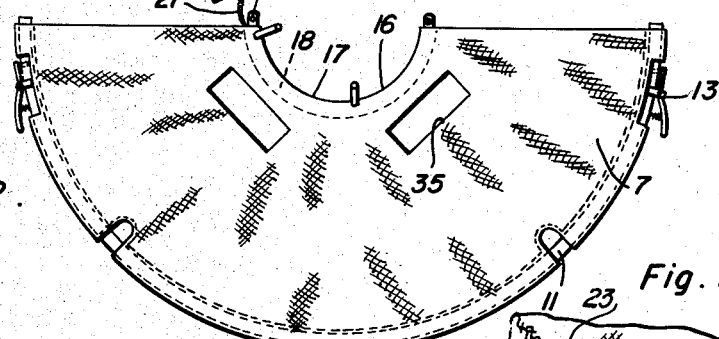
Fig. 2.
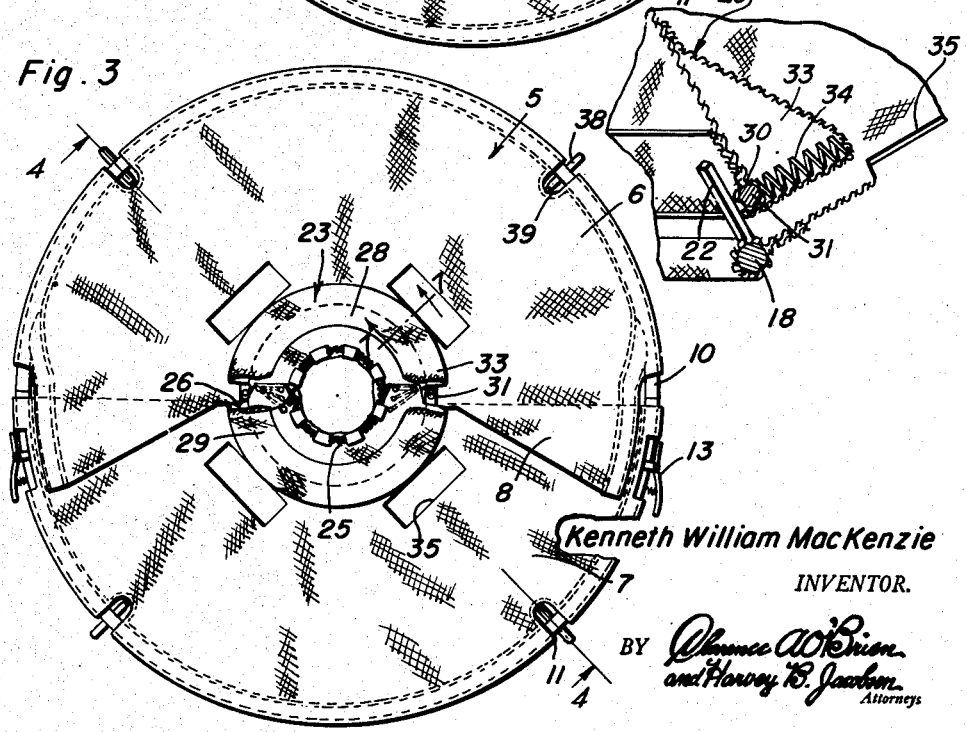
Fig. 3.
Fig. 7.
Kenneth William MacKenzie
INVENTOR.
BY *Clarence A. O'Brien*
*and Harvey B. Jacobson*
Attorneys Aug. 22, 1950     K. W. MacKENZIE     2,519,678
FRUIT GATHERER
Filed June 15, 1948                          2 Sheets-Sheet 2
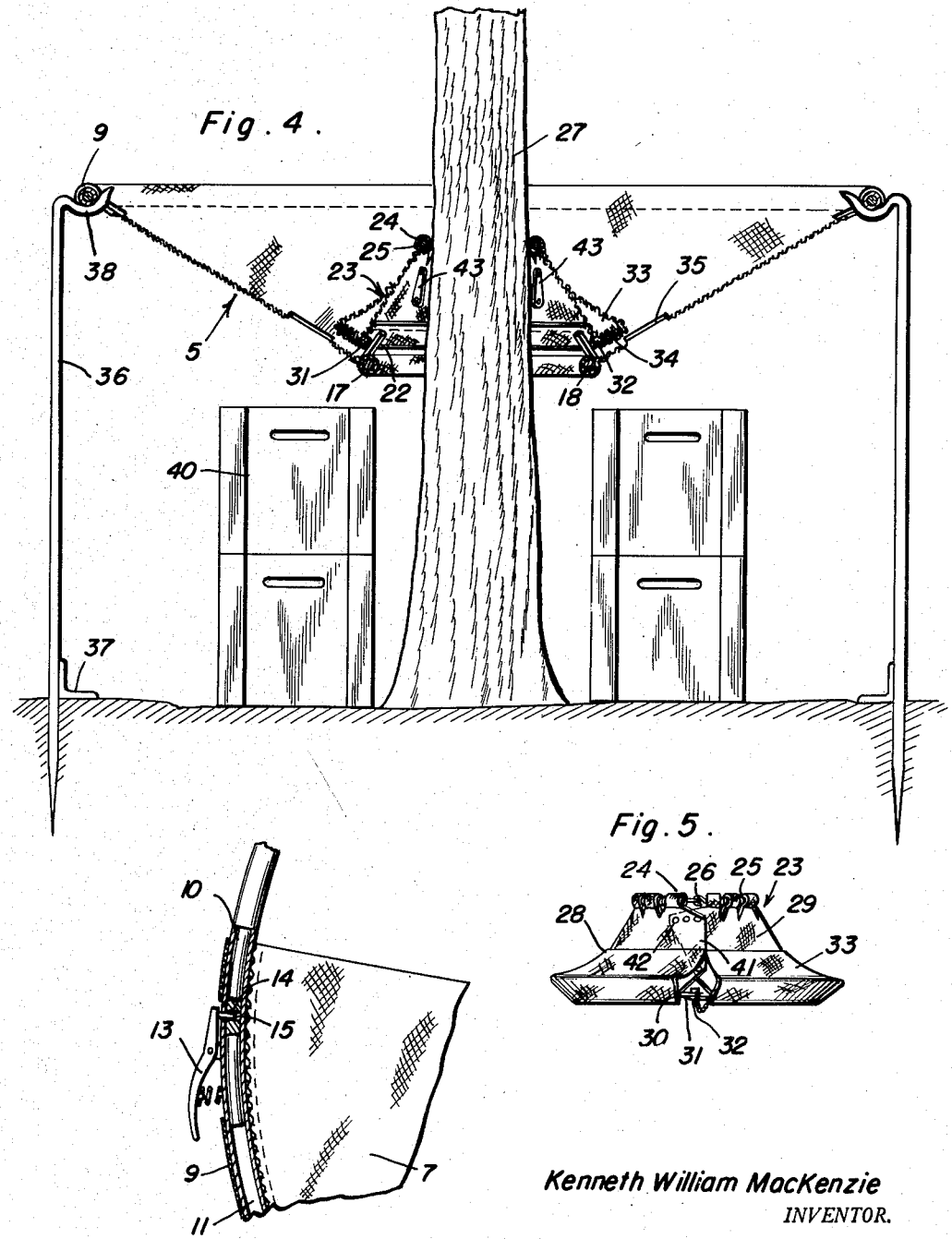
Kenneth William MacKenzie
*INVENTOR.*

Patented Aug. 22, 1950

2,519,678

UNITED STATES PATENT OFFICE 2,519,678

FRUIT GATHERER

Kenneth William MacKenzie, San Jose, Calif.

Application June 15, 1948, Serial No. 33,020

3 Claims. (Cl. 56—329)

The present invention relates to new and useful improvements in fruit gatherers and more particularly to a sectional gathering net supported in a position encircling the trunk of a tree for catching fruit shaken from the tree whereby to harvest the fruit without bruising the same.

An important object of the invention is to provide means for easily and quickly securing the sections of the net in assembled position surrounding the trunk of a tree and providing detachable supporting stakes for the rim of the net to facilitate its transportation and for storing the same in a compact form, when not in use.

A further object of the invention is to provide discharge openings in the net through which the fruit pass into shipping boxes or crates placed under the net and to provide a deflecting hood at the center of the net and surrounding the tree for guiding the fruit to the openings.

A still further object is to provide an apparatus of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a plan view of one section of the net;

Figure 2 is a similar view of the other section of the net;

Figure 3 is a plan view of the sections of the net and hood in assembled position;

Figure 4 is a transverse sectional view taken on a line 4—4 of Figure 3 and showing the net supported in position under a tree;

Figure 5 is a side elevational view, on a reduced scale, of the deflecting hood;

Figure 6 is an enlarged fragmentary sectional view of one of the locks for the ends of the connecting ring for the section of the net; and, Figure 7 is an enlarged fragmentary transverse sectional view taken on a line 7—7 of Figure 3.

Referring now to the drawings in detail wherein for the purpose of illustration I have disclosed a preferred embodiment of the invention, the numeral 5 designates generally a fruit gathering net preferably constructed of canvas and composed of a pair of sections 6 and 7, the section 7 being semi-circular in form and section 6 being slightly larger in area to provide overlapping edges 8 for the section 7 where the sections are secured in assembled relation to each other.

The outer edge of the sections are formed with a casing 9 in which the semi-circular sections 10 and 11 of a rigid metal ring are enclosed. The sections 10 and 11 of the ring are of hollow construction and the ends of the section 10 are provided with locking bars 12 extending therefrom for insertion in the ends of the section 11. Each end of the section 11 is provided with a spring biased catch 13 in the form of a pivoted lever having a detent 14 at its outer end for locking in an opening 15 in the bar 12 to thus secure the sections 10 and 11 of the ring in assembled relation.

An opening 16 is provided at the center of the net 5, the edges of the opening likewise being formed with a casing 17 in which a sectional collar 18 is positioned, the ends of the sections of the collars overlapping and provided with aligned openings 19 for receiving a locking pin 20 held against loss from the net by a short length of chain 21.

Inwardly inclined arms 22 are suitably connected to and extend upwardly from the collar 18 and over which is positioned the lower edge of a flexible deflector 23 to freely support the lower edge of the deflector and to center the deflector on the tree.

The deflector 23 is of substantially frusto-conical form preferably of canvas and is formed with loops 24 at its upper edge enclosing a coil spring 25 having its ends connected to each other by inter-engaging hooks 26 for embracing a tree trunk 27.

The deflector 23 is likewise composed of a pair of substantially semi-circular sections 28 and 29 having a casing 30 at their lower edges for receiving a sectional ring 31 which rests on arms 22. The ends of the ring 31 overlap and are apertured to receive a locking pin 32.

The lower edge of the deflector 23 is provided with an outwardly projecting hollow flange 33 likewise constructed of canvas material and in which a plurality of coil springs 34 are positioned, the outer edge of the flange 33 terminating adjacent discharge openings 35 formed in the net 5.

The sections 10 and 11 of the outer ring of the net 5 are supported in an elevated position surrounding the trunk 27 of a tree by stakes 36 driven into the ground and provided with stops or gauges 37 adjacent their lower ends to position the upper ends of the stakes at a uniform height. Hooks 38 are formed at the upper ends of the stakes received in openings 39 at the edges of the net 5 for supporting the ring sections 10 and 11 in the hooks.

The net slopes inwardly toward its center and as the fruit is shaken from the tree the same drops into the net and is discharged through the openings 35 into boxes or crates 40 positioned thereunder. The deflector 23 prevents crowding or accumulation of the fruit at the center of the net and guides the same to the openings 35.

The edges of sections 28 and 29 overlap as shown at 41 and are adjustably secured to each other by snap fasteners or the like 42 according to the diameter of the trunk of the tree. Resilient metal stiffening strips 43 are suitably secured vertically at the inside of the deflector hood 23.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A fruit gatherer comprising a net surrounding a tree and sloping toward its center and having discharge openings adjacent its lower portion, a conical deflector surrounding the tree above the net for guiding fruit into the opening, said net and said deflector being composed of substantially semi-circular fabric sections, resilient means at the top of the deflector embracing the tree, rigid annular members at the center of the net and at the lower end of the deflector, interfitting means between said members holding the same spaced from the tree, an outwardly flared flange of flexible material at the lower edge of the deflector covering the rigid annular members and shielding the same from fruit dropping on the deflector, and resilient means supporting the flange at its underside.

2. A fruit gatherer comprising a substantially conical fabric net surrounding a tree and composed of a pair of semi-circular net sections, a sectional metal ring at the outer edge of the net and comprising a pair of ring sections secured in the outer edge of the respective net sections, one ring section having hollow ends telescopically receiving the ends of the other ring section, means locking the ring sections in assembled relation, a sectional inner metal ring at the inner edges of the net sections, means detachably connecting the inner ring sections to each other, a sectional frusto-conical fabric deflector at the center of the net, arms projecting upwardly and inwardly from the inner ring of the net into the lower end of the deflector for centering the same on the tree, and resilient attaching means at the top of the deflector embracing a tree above the net, said deflector sloping outwardly from the tree and supported at its lower edge on said arms, and said deflector having a hollow annular yieldable chamber at the lower edge of the deflector.

3. A fruit gatherer comprising a substantially conical fabric net surrounding a tree and composed of a pair of semi-circular net sections, a sectional metal ring at the outer edge of the net and comprising a pair of ring sections secured in the outer edge of the respective net sections, one ring section having hollow ends telescopically receiving the ends of the other ring section, means locking the ring sections in assembled relation, a sectional inner metal ring at the inner edges of the net sections, means detachably connecting the inner ring sections to each other, a sectional frusto-conical fabric deflector at the center of the net, arms projecting upwardly and inwardly from the inner ring of the net into the lower end of the deflector for centering the same on the tree, resilient attaching means at the top of the deflector embracing a tree above the net, said deflector sloping outwardly from the tree and supported at its lower edge on said arms, and said deflector having a hollow annular fabric chamber at its lower edge, and resilient expanding means in the chamber.

KENNETH WILLIAM MacKENZIE.

REFERENCES CITED

The following references are of record in the file of this patent:

UNITED STATES PATENTS

| Number | Name | Date |
|---|---|---|
| 395,947 | Bradley | Jan. 8, 1889 |
| 771,267 | Read | Oct. 4, 1904 |
| 948,579 | Nickell | Feb. 8, 1910 |
| 1,366,563 | Fleckner | Jan. 25, 1921 |
| 1,445,596 | Johnston | Feb. 13, 1923 |
| 2,436,173 | Knapp | Feb. 17, 1948 |